(12) United States Patent
Mueller et al.

(10) Patent No.: US 11,098,154 B2
(45) Date of Patent: Aug. 24, 2021

(54) FLAME-RETARDANT PHOSPHORUS-FUNCTIONAL POLYETHER CARBONATE POLYOL AND METHOD FOR PRODUCTION THEREOF

(71) Applicant: Covestro AG, Leverkusen (DE)

(72) Inventors: Thomas Ernst Mueller, Aachen (DE); Christoph Guertler, Cologne (DE); Kai Laemmerhold, Aachen (DE); Muhammad Afzal Subhani, Aachen (DE); Burkhard Koehler, Zierenberg (DE); Walter Leitner, Aachen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 172 days.

(21) Appl. No.: 16/486,029

(22) PCT Filed: Apr. 3, 2018

(86) PCT No.: PCT/EP2018/058425
§ 371 (c)(1),
(2) Date: Aug. 14, 2019

(87) PCT Pub. No.: WO2018/185069
PCT Pub. Date: Oct. 11, 2018

(65) Prior Publication Data
US 2020/0048402 A1    Feb. 13, 2020

(30) Foreign Application Priority Data

Apr. 5, 2017  (EP) .................................... 17165056

(51) Int. Cl.
| | |
|---|---|
| *C08G 18/50* | (2006.01) |
| *C08G 18/73* | (2006.01) |
| *C08G 64/18* | (2006.01) |
| *C08G 64/34* | (2006.01) |
| *C08G 64/42* | (2006.01) |
| *C08J 9/00* | (2006.01) |
| *C09D 5/18* | (2006.01) |
| *C09D 175/08* | (2006.01) |
| *C09J 9/00* | (2006.01) |
| *C09J 175/08* | (2006.01) |

(52) U.S. Cl.
CPC ......... *C08G 18/5078* (2013.01); *C08G 18/73* (2013.01); *C08G 64/183* (2013.01); *C08G 64/34* (2013.01); *C08G 64/42* (2013.01); *C08J 9/00* (2013.01); *C09D 5/18* (2013.01); *C09D 175/08* (2013.01); *C09J 9/00* (2013.01); *C09J 175/08* (2013.01); *C08J 2375/08* (2013.01)

(58) Field of Classification Search
CPC .......................... C08G 18/44; C08G 18/5078
See application file for complete search history.

(56) References Cited

U.S. PATENT DOCUMENTS

2016/0208080 A1 *  7/2016  Laemmerhold .... C08G 18/7621

FOREIGN PATENT DOCUMENTS

| | | | | |
|---|---|---|---|---|
| CA | 2799344 A1 | * | 11/2011 | ......... C08G 18/4072 |
| EP | 2395039 A1 | | 12/2011 | |

OTHER PUBLICATIONS

International Search Report for PCT/EP2018/058425 dated May 22, 2018.
Written Opinion of the International Searching Authority for PCT/EP2018/058425 dated May 22, 2018.

* cited by examiner

*Primary Examiner* — Christopher M Rodd
(74) *Attorney, Agent, or Firm* — K&L Gates LLP

(57) ABSTRACT

A process for preparing a phosphorus-functional polyether-carbonate polyol, comprising reacting a polyethercarbonate polyol having unsaturated groups with a phosphorus-functional compound of formula (Ia):

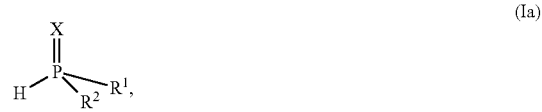

wherein X=O or S; and wherein $R^1$ and $R^2$ are selected from the group consisting of C1-C22 alkyl, C1-C22 alkoxy, C1-C22 alkylsulfanyl, C6-C70 aryl, C6-C70 aryloxy, C6-C70 arylsulfanyl, C7-C70 aralkyl, C7-C70 aralkyloxy, C7-C70 aralkylsulfanyl, C7-C70 alkylaryl, C7-C70 alkylaryloxy, C7-C70 alkylarylsulfanyl, or wherein $R^1$ and $R^2$ are bridged to one another directly and/or via heteroatoms and are selected from the group consisting of C1-C22 alkylene, oxygen, sulfur, and $NR^5$, wherein $R^5$ is hydrogen, C1-C22 alkyl, C1-C22 acyl, C7-C22 aralkyl, or C6-C70 aryl radical. A process for preparing a phosphorus-functional polyurethane polymer is disclosed. Phosphorus-functional polyethercarbonate polyol, phosphorus-functional polyurethane polymer, flame-retardant adhesion promoter, filler-activator, flame retardant, flame-retardant coating, foam, sealing compound, thermoplastic, thermoset, rubber, and a moulded body are disclosed.

16 Claims, No Drawings

FLAME-RETARDANT PHOSPHORUS-FUNCTIONAL POLYETHER CARBONATE POLYOL AND METHOD FOR PRODUCTION THEREOF

CROSS-REFERENCE TO RELATED APPLICATIONS

This application is a U.S. national stage application, filed under 35 U.S.C. § 371, of International Application No. PCT/EP2018/058425, which was filed on Apr. 3, 2018, and which claims priority to European Patent Application No. 17165056.7, which was filed on Apr. 5, 2017. The contents of each are incorporated by reference into this specification.

FIELD

The invention relates to a process for preparing a phosphorus-functional polyethercarbonate polyol, in which a polyethercarbonate polyol having unsaturated groups is reacted with a phosphorus-functional compound. The invention further relates to a phosphorus-functional polyethercarbonate polyol preparable by the process of the invention, and the use thereof including in the production of a phosphorus-functional polyurethane polymer.

BACKGROUND

As well as having a tailored functionality, modern plastics are also intended to do increased justice to environmental concerns. As well as by a general optimization of preparation processes, this can also be achieved through the use of greenhouse gases, such as carbon dioxide, as building blocks for the synthesis of polymers. Accordingly, for example, a better environmental balance for the process can be obtained overall via the fixing of carbon dioxide. This path is being followed in the area of the production of polyethercarbonates, and has been a topic of intense research for more than 40 years (e.g., Inoue et al., Copolymerization of Carbon Dioxide and Alkylenoxide with Organometallic Compounds; Die Makromolekulare Chemie 130, 210-220, 1969). In one possible preparation variant, polyethercarbonates are obtained by a catalytic reaction of epoxides and carbon dioxide in the presence of H-functional starter substances ("starters"). This reaction is shown in schematic form in scheme (I), where R is an organic radical such as alkyl, alkylaryl or aryl, each of which may also contain heteroatoms, for example O, S, Si, etc., and where a, b and c are each integers, and where the product shown here in scheme (I) for the polyethercarbonate polyol should merely be understood in such a way that blocks having the structure shown may in principle be present in the polyethercarbonate polyol obtained, but the sequence, number and length of the blocks and the OH functionality of the starter may vary, and it is not restricted to the polyethercarbonate polyol shown in scheme (I).

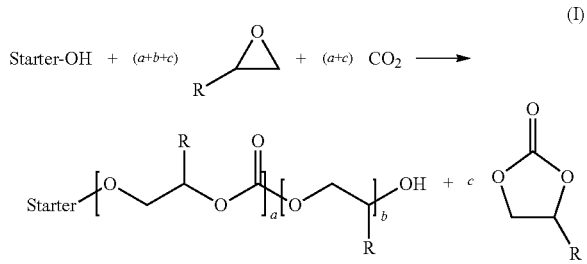

(I)

A further product, in this case an unwanted by-product, arising alongside the polyethercarbonate is a cyclic carbonate (for example, for R=CH$_3$, propylene carbonate).

In principle, it is possible here to functionalize this type of polyethercarbonate polyols in a specific manner for particular fields of use. If what is desired is, for example, for the polymer to have particular flame-retardant properties, this can be achieved in different ways. Firstly, flame retardancy of these polymers can be effected by addition of low molecular weight or oligomeric phosphorus compounds. Heterogeneous solids, such as (encapsulated) red phosphorus or melamine polyphosphate, can also be added at this point. A disadvantage, by contrast, is that these flame retardancy additives can worsen the mechanical and other physical properties of polymers. These adverse effects are mentioned, for example, in US 20130046036 A1.

A further strategy for preparation of phosphorus-containing polyethercarbonate polyols is the use of phosphorus-containing monomers in the course of the polyethercarbonate synthesis. In this context, epoxides and cyclic anhydrides are monomers that can be incorporated into the polymer chain of polyethercarbonates. US 2008/0227884 describes, for example, the preparation of phosphorus-functional epoxides, for example by free-radical addition of 9,10-dihydro-9-oxa-10-phosphaphenanthrene 10-oxide (DOPO) onto allyl glycidyl ether and the use of the reaction product as reactive flame retardancy additive in epoxy resins. However, the use of such comonomers in the copolymerization of CO$_2$ and epoxides using metal salts or complexes as catalysts has the disadvantage that the phosphorus-functional epoxides can interact with the catalyst and hence the catalytic activity is impaired. What would thus be desirable would be to provide the phosphorus functionality of the polyethercarbonate polyols only after the polymerization.

SUMMARY

It is an object of the present invention to provide an improved process for preparing flame-retardant polyethercarbonate polyols that does not entail any disadvantages with regard to the preparation of the polymers per se.

This object is achieved in accordance with the invention by a process for preparing a phosphorus-functional polyethercarbonate polyol, in which a polyethercarbonate polyol having unsaturated groups is reacted with a phosphorus-functional compound of formula (Ia)

(Ia)

where X=O, S,

R$^1$ and R$^2$ are selected from the group comprising C1-C22 alkyl, C1-C22 alkoxy, C1-C22 alkylsulfanyl, C6-C70 aryl, C6-C70 aryloxy, C6-C70 arylsulfanyl, C7-C70 aralkyl, C7-C70 aralkyloxy, C7-C70 aralkylsulfanyl, C7-C70 alkylaryl, C7-C70 alkylaryloxy, C7-C70 alkylarylsulfanyl, or where R$^1$ and R$^2$ are bridged to one another directly and/or via heteroatoms and are selected from the group comprising C1-C22 alkylene, oxygen, sulfur and NR$^5$ where R$^5$ is hydrogen, C1-C22 alkyl, C1-C22 acyl, C7-C22 aralkyl or C6-C70 aryl radical.

DETAILED DESCRIPTION

The invention is based on the finding that the subsequent functionalization of the polyethercarbonate polyol with a phosphorus-functional compound of formula (Ia) overcame the aforementioned disadvantages from the prior art since the fixed incorporation into the polymer resulted in no occurrence of any plasticizing effect by short-chain flame retardancy additives, nor of any deactivation of the polymerization catalyst, since the polymer chain of the polyethercarbonate polyol has already formed at the time of incorporation of the phosphorus-functional compound. It has been found here that the incorporation of double bonds into the main polymer skeleton of the polyethercarbonate polyol permits comparatively simple addition of the phosphorus-functional compound.

It has been found that, surprisingly, this preparation process enables efficient and controlled functionalization of unsaturated polyethercarbonate polyols with phosphorus-functional compounds. The phosphorus groups are bonded here covalently to the polymer skeleton. This results in functionalized polyethercarbonate polyol having a defined phosphorus functionality. This contrasts with polymers having phosphorus groups weakly bonded via ionic or van der Waals interactions, wherein the content of phosphorus compound and the properties thereof can change in the course of storage or in subsequent reaction or purification steps. This is ruled out by virtue of the covalent attachment of the phosphorus-containing group to the polymer skeleton by the process of the invention. Furthermore, this process regime enables rapid and controlled construction of the actual polyethercarbonate polyols without any risk of inactivation or modification of the catalyst required to construct the polyethercarbonate polyols by phosphorus-containing compounds.

In addition, via the separate process regime, it is also possible to introduce a variable amount of phosphorus compounds into a polyethercarbonate polyol having defined functionality. This functionality can be chosen depending on the requirements in later application. In this way, it is possible to use one production batch of phosphorus-functional polyethercarbonate polyols to prepare differently modified products. A further advantage can additionally result from the fact that not all unsaturated groups of the polyethercarbonate polyols have to be modified. As a result, after the phosphorus-functional modification, there may be further functional groups present on the polymer skeleton that can be utilized within further reaction steps. For example, this functionality can be utilized in further crosslinking reactions. The resultant phosphorus-containing polyethercarbonate polyols are additionally environmentally uncontroversial. The phosphorus-functional polyethercarbonate polyols obtainable by this process, in the event of fire, can induce enhanced carbonization, which forms a protective surface layer which ultimately reduces the amount of combustible material. Furthermore, there can be additional release of gases to form a voluminous insulation layer having a flame-retardant effect. As a further possibility, the phosphorus-functional polyethercarbonate polyols or breakdown products formed therefrom can capture free-radical species in the gas phase and hence inhibit the combustion process.

Embodiments and further aspects of the present invention are described hereinafter. These may be combined with one another as desired unless the opposite is apparent from the context.

In a preferred embodiment of the process, the phosphorus-functional compound may comprise (Ib)

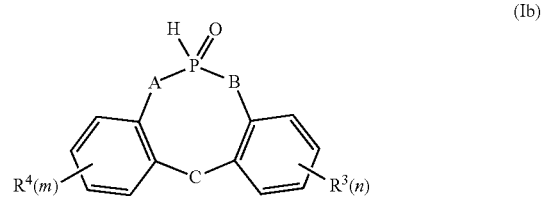

where

A, B and C are independently selected from the group comprising a chemical bond, O, NH, N—(C1-C10 alkyl), N—(C6-C14 aryl) and $R^3$ and $R^4$ are independently selected from the group comprising C1-C10 alkyl, C1-C10 alkoxy, C6-C14 aryl, C6-C14 aryloxy, C9-C17 aralkyl and m, n are independently 0, 1, 2, 3 or 4.

These compounds of formula (Ib) with the substituent pattern detailed have been found to be particularly suitable for addition onto polyethercarbonate polyols having unsaturated groups.

The phosphorus-functional polyethercarbonate polyols obtainable show an extremely good flame-retardant effect with just a relatively small change in the other use properties of the polymer. This may be applicable especially to the viscosity of the phosphorus-functional polyethercarbonate polyol, which should be kept to a minimum in the course of further reaction steps. The addition of this class of compound with the substituent pattern presented onto the polyethercarbonate polyol having unsaturated groups leads to phosphorus-functional polyethercarbonate polyols having only a slightly elevated viscosity which is particularly suitable for further crosslinking steps.

In a further configuration of the process, the substituents $R^3$ and $R^4$ of the formula (Ib) may be selected from the group comprising C1-C8 alkyl and C1-C8 alkoxy, and n, m may independently be 0 or 1. These compounds having the substituent pattern detailed can contribute to a distinct flame-retarding effect of the phosphorus-functional polyethercarbonate polyols without too significantly altering essential properties of the base polymer. This may especially be applicable to further reactions with crosslinking reagents. Without being bound by theory, this may probably be attributed to the steric circumstances of the relatively short-chain $R_3$ and $R_4$ radicals.

In an additional aspect of the process, the phosphorus-functional compound may be 9,10-dihydro-9-oxa-10-phosphaphenanthrene 10-oxide (DOPO), diethyl phosphite, phenyl P-phenylphosphinate (CAS Reg. 52744-21-5) and/or butyl P-methylphosphinate (CAS Reg. 6172-80-1). More particularly, DOPO has been found to be suitable in the context of the process regime of the invention for addition onto polyethercarbonate polyols having unsaturated groups. This reaction can be conducted extremely selectively and with a low level of by-products. The products obtainable by the process of the invention show reproducible and good flame-retardant action and, in spite of the phosphorus functionalization, can still be reacted sufficiently to give further, for example more highly crosslinked, polyoxyalkylene polymers.

Polyethercarbonate polyols having unsaturated groups in the context of the invention are polyethercarbonate polyols wherein the molecular structure contains one or more C—C double or triple bonds. These may also be conjugated, and aromatic compounds are not ruled out. However, aromatic groups may be present in the molecular structure in addition to the unsaturated group.

Polyethercarbonate polyols having unsaturated groups can be obtained, for example, by reacting a starter compound with one or more alkylene oxides, carbon dioxide and one or more further monomers selected from the group of the alkylene oxides, cyclic anhydrides of dicarboxylic acids, the lactones, lactides, cyclic 6-membered carbonates, with the proviso that at least one of the further monomers used contains one or more C—C double or triple bonds.

In a further configuration of the process, the polyethercarbonate polyol having unsaturated groups may have a proportion of unsaturated comonomers within the polyethercarbonate polyol at a level of not less than 0.1 mol % and not more than 50 mol %. Preferably, the proportion of unsaturated comonomers within the polyethercarbonate polyol is not less than 1 mol % and not more than 40 mol %, more preferably not less than 5 mol % and not more than 25 mol %. This number of possible binding sites of the phosphorus-functional compounds onto the polyethercarbonate polyol having unsaturated groups has been found to be particularly advantageous. Firstly, it is possible to obtain phosphorus-functional polyethercarbonate polyols that can provide sufficient flame retardancy and, secondly, significant changes in the polymer properties of the polyoxyalkylene polymer are avoided. This may especially be applicable to the viscosity of the modified base polymer, which could rise significantly in the case of an even higher proportion of unsaturated comonomers Smaller contents of unsaturated comonomers in the polyoxyalkylene polymer can lead to only inadequate phosphorus-functional functionalization of the polymer.

In a further embodiment of the process, the molar ratio of phosphorus-functional compounds to unsaturated groups of the polyethercarbonate polyol may be 10:1 to 1:1, preferably 2:1 to 1:1, most preferably 1.25:1 to 1:1.25.

The phosphorus content of the phosphorus-functional polyethercarbonate polyols obtained by the process of the invention may be between 0.5% and 15% by weight, preferably between 1% and 10% by weight and more preferably between 1% and 4% by weight. This phosphorus content may contribute to a sufficient flame-retardant effect of the phosphorus-functional polyethercarbonate polyols and of the products produced therefrom.

In a preferred embodiment of the invention, the process for preparing the polyethercarbonate polyol having unsaturated groups comprises the steps of (α) initially charging an H-functional starter compound and a DMC catalyst, (β) optionally metering in an epoxide, (γ) metering in (γ1) at least one epoxide, and (γ2) at least one epoxide, a cyclic anhydride of a dicarboxylic acid, a lactone, a lactide and/or a cyclic 6-membered carbonate having a double bond, and (γ3) carbon dioxide.

Epoxides, cyclic anhydrides of a dicarboxylic acid, of a lactone, of a lactide and/or of a cyclic 6-membered carbonate that have an unsaturated group, are, for example, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids (such as oleic acid, linoleic acid, conjuene fatty acid or linolenic acid) and/or partly epoxidized fats and oils (such as partly epoxidized soya oil, linseed oil, rapeseed oil, palm oil or sunflower oil), maleic anhydride, norbornenedioic anhydride, dodecenylsuccinic anhydride, tetradecenylsuccinic anhydride, hexadecenylsuccinic anhydride, octadecenylsuccinic anhydride, itaconic anhydride, dimethylmaleic anhydride, allylnorbornenedioic anhydride, TMP monoallyl ether carbonate, pentaerythrityl diallyl ether carbonate, and epoxides, cyclic anhydrides of a dicarboxylic acid, of a lactone, of a lactide and/or of a cyclic 6-membered carbonate that are substituted by an allyl glycidyl ether group.

It has been found that, surprisingly, this type of preparation leads to polyethercarbonate polyols having unsaturated groups that are particularly suitable for the purposes of the further phosphorus-functional modification. Especially polyethercarbonate polyols having unsaturated side chains show good reactivity and particularly low viscosity, which, without being bound by theory, is caused by the reduction in the intermolecular polymer-polymer interactions caused by the incorporation of the unsaturated side chains. Especially the terpolymerization with epoxides, where at least one of the epoxides bears a double bond, and/or epoxides with cyclic anhydrides shows this effect and is much more advantageous compared to a "simple" polymerization with just one monomer species having unsaturated groups.

Preferably, prior to the reaction of the unsaturated groups with phosphorus-functional compounds, the terminal OH groups of the polyethercarbonate polyols are converted to a chemical group that does not react with phosphorus-functional groups. The methods commonly used for the purpose are known to those skilled in the art. For example, this can be effected by reaction of the OH groups with trialkylsiloxanes, with detachment of alcohol. Suitable trialkylsiloxanes are, for example, trimethylsiloxane, triethylsiloxane. An alternative method is the reaction of the OH groups with alkylating reagents, for example trimethyloxonium salts, methylsulfonate and methylsulfate. This can enable further reaction opportunities on the OH groups of the polyethercarbonate polyols after removal of the protecting group.

A preferred embodiment of the method includes the use of polyethercarbonate polyols having electron-rich double bonds, which means double bonds substituted by +M or substituents such as alkyl or alkoxyalkyl or cyclohexyl groups. In general, electron-rich double bonds in the context of the invention are those that are electron-richer than ethylene. Particular preference is given to allyl ethers or vinylcyclohexenes.

The introduction of these double bonds into the base skeleton of the polyethercarbonate polyols can be effected by the use of one or more epoxides having double bonds as comonomer. Examples of suitable epoxides are allyl glycidyl ether, vinylcyclohexene oxide, butadiene monoepoxide, isoprene monoepoxide or limonene oxide, preference being given to allyl glycidyl ether.

The introduction of electron-rich double bonds into the polyethercarbonate polyol polymer can also be effected by use of one or more cyclic anhydrides of dicarboxylic acids containing electron-rich double bonds as comonomer. Examples of suitable cyclic anhydrides are 4-cyclohexene-1,2-dicarboxylic anhydride, 4-methyl-4-cyclohexene-1,2-dicarboxylic anhydride, norbornenedioic anhydride, allylnorbornenedioic anhydride, dodecenylsuccinic anhydride, tetradecenylsuccinic anhydride, hexadecenylsuccinic anhydride or octadecenylsuccinic anhydride, where the double bond in the case of the alkenylsuccinic anhydrides is not an exo-double bond on the ring.

An alternative embodiment includes the use of polyethercarbonate polyols having electron-deficient double bonds, which means double bonds substituted by −M or −I substituents such as carbonyl groups. Such double bonds can preferably be introduced into the polyethercarbonate polyol polymer by use of glycidyl esters of α,β-unsaturated acids, such as acrylic acid or methacrylic acid, as comonomer. In a preferred embodiment, the double bonds can also be introduced through the use of cyclic anhydrides bearing double bonds adjacent to a carbonyl group as comonomer.

It is also possible to phosphorus-functionalize polyethercarbonate polyols bearing simultaneously electron-rich and -deficient double bonds. It is also possible to use mixtures of polyethercarbonate polyols with various unsaturated units for the phosphorus functionalization. However, preference is given to polyethercarbonate polyols or mixtures of polyethercarbonate polyols in which the molar content of electron-rich double bonds is greater than or equal to the content of electron-deficient double bonds. Very particular preference is given to using polyethercarbonate polyols containing electron-rich double bonds only.

Specifically for the introduction of phosphorus-functional groups, preference is given to double bonds having a free =CH₂ group. These are called α-olefins and generally have only low steric hindrance at the double bond and can be reacted relatively easily. Allyl glycidyl ethers or vinylcyclohexene oxide are, by way of example, epoxides usable as comonomers that introduce such double bonds into the polyethercarbonate polyol chain.

In addition, monomers used for synthesis of the polyethercarbonate polyol having unsaturated groups may be alkylene oxides (epoxides) having 2-45 carbon atoms that do not bear a double bond. The alkylene oxides having 2-45 carbon atoms are, for example, one or more compounds selected from the group comprising ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, epoxides of C6-C22 α-olefins, such as 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, C1-C24 esters of epoxidized fatty acids, epichlorohydrin, glycidol, and derivatives of glycidol, for example glycidyl ethers of C1-C22 alkanols and glycidyl esters of C1-C22 alkanecarboxylic acids. Examples of derivatives of glycidol are phenyl glycidyl ether, cresyl glycidyl ether, methyl glycidyl ether, ethyl glycidyl ether and 2-ethylhexyl glycidyl ether. Alkylene oxides used may preferably be ethylene oxide and/or propylene oxide, especially propylene oxide.

Polyethercarbonate polyols having unsaturated groups are shown by way of example in formula (II), where the product shown here in the formula (II) for the polyethercarbonate polyol should be understood merely such that blocks having the structure shown may in principle be found in the polyethercarbonate polyol obtained, but the sequence, number and length of the blocks and the OH functionality of the starter may vary and is not restricted to the polyethercarbonate polyol shown in formula (II), and

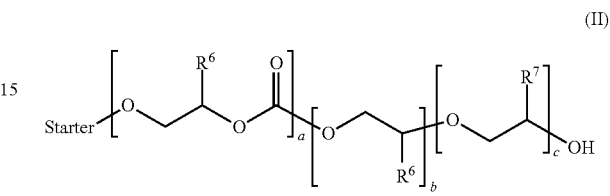

(II)

where $R^6$ is C1-C43 alkyl, C7-C70 alkylaryl or C6-C70 aryl, where heteroatoms such as O, S, Si may also be present in each case, and where $R^7$ is C1-C43 alkenyl, or C7-C70 alkenylaryl, where heteroatoms such as O, S, Si may also be present in each case, and where a and b are an integer and the ratio of a/b is 2:1 to 1:20, especially 1.5:1 to 1:10, and where c is zero or an integer and the proportion of unsaturated comonomers within the polyethercarbonate polyol (c) based on the chemical groups present without the starter (sum of a+b+c) has a value of not less than 0.1:100 and not more than 50:100. Preferably, the proportion of unsaturated groups within the polyetherestercarbonate polyol is not less than 1:100 and not more than 40:100, more preferably not less than 5:100 and not more than 25:100.

Polyetherestercarbonate polyols having unsaturated groups are shown by way of example in formula (IIa), where the product shown here in the formula (IIa) for the polyetherestercarbonate polyol should be understood merely such that blocks having the structure shown may in principle be found in the polyetherestercarbonate polyol obtained, but the sequence, number and length of the blocks and the OH functionality of the starter may vary and is not restricted to the polyetherestercarbonate polyol shown in formula (III), and

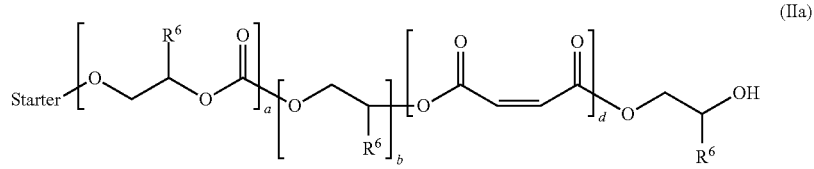

(IIa)

where $R^6$ is C1-C43 alkyl, C7-C70 alkylaryl or C6-C70 aryl, where heteroatoms such as O, S, Si may also be present in each case, and where a and b are an integer and the ratio of a/b is 2:1 to 1:20, especially 1.5:1 to 1:10, and where d is an integer and the proportion of unsaturated comonomers within the polyetherestercarbonate polyol (d) based on the chemical groups present without the starter (sum of a+b+d) has a value of not less than 0.1:100 and not more than 50:100. Preferably, the proportion of unsaturated groups within the polyethercarbonate polyol is not less than 1:100 and not more than 40:100, more preferably not less than 5:100 and not more than 25:100.

A preferred embodiment of the process usable in accordance with the invention for preparation of polyethercarbonate polyols having unsaturated groups includes the reaction of one or more H-functional starter compounds, one or more alkylene oxides, one or more comonomers and carbon dioxide in the presence of a DMC catalyst, wherein (α) an H-functional starter substance or a mixture of at least two H-functional starter substances is initially charged and any water and/or other volatile compounds are removed by elevated temperature and/or reduced pressure ("first activation stage"), with addition of the DMC catalyst to the H-functional starter substance or to the mixture of at least two H-functional starter substances before or after the 1st activation stage, (β) a portion (based on the total amount of the amount of epoxides/cyclic anhydrides used in steps (β) and (γ)) of one or more epoxides is added to the mixture resulting from step (α) ("second activation stage"), it optionally being possible for the addition of a portion of epoxide to take place in the presence of $CO_2$ and/or inert gas (such as nitrogen or argon, for example), and where repeated metered addition is likewise possible (i.e. step (β) can be repeated more than once, preferably once to three times), and (γ) one or more epoxides/cyclic anhydrides, one or more comonomers and carbon dioxide are metered continually into the mixture resulting from step (β), and the epoxides/cyclic anhydrides used for the terpolymerization may be the same as or different from the epoxides used in step (β) ("polymerization stage").

Step (α):

The addition of the individual components in step (α) can be effected simultaneously or successively in any sequence; preferably, in step (α), the DMC catalyst is first initially charged and the H-functional starter compound is added simultaneously or subsequently.

A preferred embodiment provides a process wherein, in step (α), (α1) a reactor is initially charged with the DMC catalyst and one or more H-functional starter compounds, (α2) [first activation stage] an inert gas (for example, nitrogen or a noble gas such as argon), an inert gas/carbon dioxide mixture, or carbon dioxide is passed through the reactor at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example).

A further preferred embodiment provides a process wherein, in step (α), (α1) the H-functional starter compound or a mixture of at least two H-functional starter compounds is initially charged, optionally under inert gas atmosphere, under an atmosphere of inert gas-carbon dioxide mixture or under a pure carbon dioxide atmosphere, more preferably under inert gas atmosphere, and (α2) [first activation stage] an inert gas, an inert gas-carbon dioxide mixture or carbon dioxide, more preferably an inert gas, is introduced into the resulting mixture of DMC catalyst and one or more H-functional starter compounds at a temperature of 50 to 200° C., preferably of 80 to 160° C., more preferably of 125 to 135° C., and at the same time, by removing the inert gas or carbon dioxide (with a pump, for example), a reduced pressure (absolute) of 10 mbar to 800 mbar, preferably of 40 mbar to 200 mbar, is set in the reactor, it being possible to add the double metal cyanide catalyst to the H-functional starter substance or to the mixture of at least two H-functional starter substances in step (a1) or immediately thereafter in step (α2).

The DMC catalyst can be added in solid form or suspended in an H-functional starter compound. If the DMC catalyst is added as a suspension, this is preferably added in step (a1) to the one or more H-functional starter compounds.

Step (β):

Step (β) of the second activation stage may take place in the presence of $CO_2$ and/or an inert gas. Step (β) preferably takes place under an atmosphere composed of an inert gas/carbon dioxide mixture (nitrogen/carbon dioxide or argon/carbon dioxide, for example) or a carbon dioxide atmosphere, more preferably under a carbon dioxide atmosphere. The establishment of an inert gas/carbon dioxide atmosphere or a carbon dioxide atmosphere and the metering of one or more alkylene oxides may take place in principle in different ways. The supply pressure is preferably established by introduction of carbon dioxide, where the pressure (in absolute terms) is 10 mbar to 100 bar, preferably 100 mbar to 50 bar and especially preferably 500 mbar to 50 bar. The metered addition of the epoxide(s)/cyclic anhydride(s) may commence at a supply pressure chosen arbitrarily beforehand. The total pressure (in absolute terms) of the atmosphere set in step (β) is preferably a range from 10 mbar to 100 bar, preferably 100 mbar to 50 bar, and more preferably 500 mbar to 50 bar. Optionally, during or after the metered addition of the epoxides/cyclic anhydrides, the pressure can be readjusted by introducing further carbon dioxide, where the pressure (in absolute terms) is 10 mbar to 100 bar, preferably 100 mbar to 50 bar and more preferably 500 mbar to 50 bar.

In a preferred embodiment, the amount of one or more epoxides/cyclic anhydrides used in the activation in step (β) may be 0.1% to 25.0% by weight, preferably 1.0% to 20.0% by weight, more preferably 2.0% to 16.0% by weight, based on the amount of H-functional starter compound used in step (α). The epoxides/cyclic anhydrides can be added in one step or stepwise in two or more portions.

In a preferred embodiment for preparation of the polyethercarbonate polyols having unsaturated groups, in the activation in step (β), a portion (relative to the total amount of the amount of epoxides/cyclic anhydrides used in steps (β) and (γ)) of one or more epoxides/cyclic anhydrides can be added to the mixture resulting from step (α) [second activation stage]. The addition of a portion of epoxide/cyclic anhydride can optionally be effected in the presence of $CO_2$ and/or inert gas. Step (β) may also take place more than once. The DMC catalyst is preferably used in an amount such that the amount of DMC catalyst in the resulting polyethercarbonate polyol is 10 to 10 000 ppm, more preferably 20 to 5000 ppm, and most preferably 50 to 500 ppm.

In the second activation step, the epoxide/cyclic anhydride may be added, for example, in one portion or over the course of 1 to 15 minutes, preferably 5 to 10 minutes. The duration of the second activation step is preferably 15 to 240 minutes, more preferably 20 to 60 minutes.

Step (γ):

The metered addition of epoxide, cyclic anhydride and carbon dioxide can be effected simultaneously, alternately or sequentially. It is also possible that the entire amount of carbon dioxide is metered in all at once and that only the epoxide and the cyclic anhydride are metered in simultaneously, alternately or sequentially. In a further embodiment of the invention, during the addition of the epoxides/cyclic anhydrides, the $CO_2$ pressure is raised or lowered gradually or stepwise or kept constant. Preferably, the total pressure is kept constant during the reaction by metered addition of further carbon dioxide. The metered addition of the epoxide(s)/cyclic anhydride(s) and of the $CO_2$ may take place simultaneously, alternatively or sequentially to the metered addition of carbon dioxide. It is possible to meter in the epoxide at a constant metering rate or to raise or lower the metering rate continuously or in steps, or to add the epoxide in portions. Preferably, the epoxide and/or cyclic anhydride is added to the reaction mixture at a constant metering rate. If a plurality of epoxides and/or cyclic anhydrides are used for synthesis of the polyethercarbonate polyols within one stage, the epoxides and/or cyclic anhydrides can be metered in individually or as a mixture. The metered addition of the epoxides and/or cyclic anhydrides can be effected simultaneously, alternately or sequentially, each via separate metering points (addition points), or via one or more metering points, in which case the alkylene oxides can be metered in individually or as a mixture. It is possible via the manner and/or sequence of the metered addition of the epoxides, the cyclic anhydrides and/or the carbon dioxide to synthesize random, alternating, block or gradient polyethercarbonate polyols.

Step ($\gamma$) can be conducted, for example, at temperatures of 60 to 150° C., preferably from 80 to 120° C., most preferably from 90 to 110° C. If temperatures below 60° C. are set, the reaction ceases. At temperatures above 150° C. the amount of unwanted by-products rises significantly.

Preferably, an excess of carbon dioxide is used, based on the calculated amount of carbon dioxide required in the polyethercarbonate polyol, since an excess of carbon dioxide is advantageous because of the low reactivity of carbon dioxide. The amount of carbon dioxide can be specified by way of the total pressure. An advantageous total (absolute) pressure for the copolymerization for preparation of the polyethercarbonate polyols has been found to be the range from 0.01 to 120 bar, preferably 0.1 to 110 bar, more preferably from 1 to 100 bar. It is possible to supply the carbon dioxide to the reaction vessel continuously or discontinuously. This depends on how quickly the epoxides and the $CO_2$ are consumed and on whether the product is to include any $CO_2$-free polyether blocks or blocks with different $CO_2$ contents. The concentration of carbon dioxide may also be varied during the addition of the epoxides/cyclic anhydrides. Depending on the reaction conditions selected, it is possible for the $CO_2$ to be introduced into the reactor in the gaseous, liquid or supercritical state. $CO_2$ may also be added to the reactor as a solid and then converted to the gaseous, dissolved, liquid and/or supercritical state under the chosen reaction conditions.

In step ($\gamma$), the carbon dioxide can be introduced into the mixture, for example, by (i) sparging the reaction mixture in the reactor from below, (ii) using a hollow-shaft stirrer, (iii) a combination of metering forms as per (i) and (ii), and/or (iv) sparging via the surface of the liquid, by using multilevel stirring elements.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the base of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed alkylene oxide) is sucked out of the gas space above the reaction mixture and is passed through the hollow shaft of the stirrer into the reaction mixture.

The sparging of the reaction mixture as per (i), (ii), (iii) or (iv) can be effected with freshly metered-in carbon dioxide in each case and/or may be combined with a suctioning of the gas out of the gas space above the reaction mixture and subsequent recompression of the gas. For example, the gas suctioned off from the gas space above the reaction mixture and compressed, optionally mixed with fresh carbon dioxide and/or epoxides/cyclic anhydrides, is introduced again into the reaction mixture as per (i), (ii), (iii) and/or (iv).

The pressure drop which comes about via incorporation of the carbon dioxide and of the epoxides into the reaction product during the terpolymerization is preferably compensated by freshly metered in carbon dioxide.

The introduction of the epoxides/cyclic anhydrides can be effected separately or together with the $CO_2$, either via the liquid surface or directly into the liquid phase. Preferably, the epoxides/cyclic anhydrides are introduced directly into the liquid phase, since this has the advantage of rapid mixing of the compounds introduced with the liquid phase and so local concentration peaks can be avoided. The introduction into the liquid phase can be effected via one or more inlet tubes, one or more nozzles or one or more annular arrangements of multiple metering points, which are preferably arranged at the base of the reactor and/or at the side wall of the reactor.

The three steps ($\alpha$), ($\beta$) and ($\gamma$) can be performed in the same reactor, or each can be performed separately in different reactors. Particularly preferred reactor types are stirred tanks, tubular reactors, and loop reactors. If the reaction steps ($\alpha$), ($\beta$) and ($\gamma$) are performed in different reactors, a different reactor type can be used for each step.

Polyethercarbonate polyols can be prepared in a stirred tank, in which case the stirred tank, according to the design and mode of operation, is cooled via the reactor shell, internal cooling surfaces and/or cooling surfaces within a pumped circulation system. Both in semi-batchwise application, in which the product is not removed until after the end of the reaction, and in continuous application, where the product is removed continuously, particular attention should be given to the metering rate of the epoxides. This should be set such that, in spite of the inhibiting action of the carbon dioxide, the epoxides/cyclic anhydrides can be depleted quickly enough. The concentration of free epoxides/cyclic anhydrides in the reaction mixture during the second activation stage (step $\beta$) is preferably >0% to 100% by weight, more preferably >0% to 50% by weight, most preferably >0% to 20% by weight (based in each case on the weight of the reaction mixture). The concentration of free epoxides/cyclic anhydrides in the reaction mixture during the reaction (step $\gamma$) is preferably >0% to 40% by weight, more preferably >0% to 25% by weight, most preferably >0% to 15% by weight (based in each case on the weight of the reaction mixture).

A further embodiment in a stirred tank for the copolymerization (step $\gamma$) is characterized in that one or more H-functional starter compounds are also metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). When performing the process continuously, the amount of the H-functional starter compounds metered into the reactor continuously during the reaction is preferably at least 80 mol % equivalents, particularly preferably 95 to 99.99 mol % equivalents (in each case based on the total amount of H-functional starter compounds).

In one preferred embodiment, the catalyst/starter mixture activated in steps (α) and (β) is reacted further in the same reactor with epoxides/cyclic anhydrides and carbon dioxide.

In a further preferred embodiment, the catalyst/starter mixture activated as per steps (α) and (β) is reacted further with epoxides/cyclic anhydrides and carbon dioxide in another reaction vessel (for example a stirred tank, tubular reactor or loop reactor). In a further preferred embodiment, the catalyst/starter mixture prepared in step (α) is reacted in a different reaction vessel (for example, a stirred tank, tubular reactor or loop reactor) in steps (β) and (γ) with epoxides/cyclic anhydrides and carbon dioxide.

In the case of reaction in a tubular reactor, the catalyst/starter mixture prepared in step (α), or the catalyst/starter mixture activated in steps (α) and (β), and optionally further starters, and also epoxides/cyclic anhydrides and carbon dioxide, are pumped continuously through a tube. When a catalyst/starter mixture prepared as per step (α) is used, the second activation stage as per step (β) can be effected in the first part of the tubular reactor and the terpolymerization as per step (γ) in the second part of the tubular reactor. The molar ratios of the co-reactants may vary here according to the desired polymer.

In a preferred embodiment, carbon dioxide is metered in in its liquid or supercritical form, in order to enable optimal miscibility of the components. The carbon dioxide can be introduced at the inlet of the reactor and/or via metering points which are arranged along the reactor, in the reactor. A portion of the epoxides/cyclic anhydrides may be introduced at the reactor entrance. The remaining amount of the epoxides/cyclic anhydrides is preferably introduced into the reactor via a plurality of metering points arranged along the reactor. Mixing elements of the kind sold, for example, by Ehrfeld Mikrotechnik BTS GmbH are advantageously installed for more effective mixing of the co-reactants, or mixer-heat exchanger elements, which at the same time improve mixing and heat removal. The mixing elements preferably mix metered-in $CO_2$ and epoxides/cyclic anhydrides with the reaction mixture. In an alternative embodiment, different volume elements of the reaction mixture are mixed with one another.

Loop reactors can likewise be used to prepare the polyethercarbonate polyols having unsaturated groups that are usable in accordance with the invention. These generally include reactors having internal and/or external material recycling (optionally with heat exchanger surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step (γ) is carried out may frequently be followed by a further tank or a tube ("dwell tube") in which residual concentrations of free epoxides/cyclic anhydrides present after the reaction are depleted by reaction. Preferably, the pressure in this downstream reactor is at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 10° C. to 150° C. and more preferably 20° C. to 100° C. At the end of the post-reaction time or at the outlet of the downstream reactor, the reaction mixture contains preferably less than 0.05% by weight of epoxide/cyclic anhydride. The post-reaction time or the residence time in the downstream reactor is preferably 10 min to 24 h, especially preferably 10 min to 3 h.

As suitable H-functional starter compounds (starters) it is possible to use compounds having H atoms that are active in respect of the alkoxylation. Alkoxylation-active groups having active H atoms include, for example, —OH, —$NH_2$ (primary amines), —NH— (secondary amines), —SH, and —$CO_2H$, preference being given to —OH and —$NH_2$, particular preference being given to —OH. As H-functional starter substance it is possible for there to be, for example, one or more compounds selected from the group encompassing mono- or polyhydric alcohols, polyfunctional amines, polyfunctional thiols, amino alcohols, thio alcohols, hydroxy esters, polyether polyols, polyester polyols, polyesterether polyols, polyethercarbonate polyols, polycarbonate polyols, polycarbonates, polyethyleneimines, polyetheramines (e.g. so-called Jeffamine® products from Huntsman, such as D-230, D-400, D-2000, T-403, T-3000, T-5000 or corresponding products from BASF, such as Polyetheramine D230, D400, D200, T403, T5000), polytetrahydrofurans (e.g. PolyTHF® from BASF, such as PolyTHF® 250, 650S, 1000, 1000S, 1400, 1800, 2000), polytetrahydrofuranamines (BASF product Polytetrahydrofuranamine 1700), polyetherthiols, polyacrylate polyols, castor oil, the mono- or diglyceride of ricinoleic acid, monoglycerides of fatty acids, chemically modified mono-, di- and/or triglycerides of fatty acids, and C1-C24 alkyl fatty acid esters which contain on average at least 2 OH groups per molecule. The C1-C23 alkyl fatty acid esters which contain on average at least 2 OH groups per molecule are, for example, commercial products such as Lupranol Balance® (BASF AG), Merginol® products (Hobum Oleochemicals GmbH), Sovermol® products (Cognis Deutschland GmbH & Co. KG), and Soyol® products (USSC Co.).

Monofunctional starter compounds used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Suitable monofunctional amines include: butylamine, tert-butylamine, pentylamine, hexylamine, aniline, aziridine, pyrrolidine, piperidine, morpholine. Monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, propane-1,3-diol, butane-1,4-diol, butene-1,4-diol, butyne-1,4-diol, neopentyl glycol, pentane-1,5-diol, methylpentanediols (for example 3-methylpentane-1,5-diol), hexane-1,6-diol; octane-1,8-diol, decane-1,10-diol, dodecane-1,12-diol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, in particular castor oil), and all modification products of these aforementioned alcohols with different amounts of ε-caprolactone.

The H-functional starter substances may also be selected from the substance class of the polyether polyols, especially those having a molecular weight $M_n$ in the range from 100 to 4000 g/mol. Preference is given to polyether polyols formed from repeat ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide. Suitable polyether polyols formed from repeat propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (for example Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are, for example, the Pluriol® E products from BASF SE, suitable homopolypropylene oxides are, for example, the Pluriol® P products from BASF SE, and suitable mixed copolymers of ethylene oxide and propylene oxide are, for example, the Pluronic® PE or Pluriol® RPE products from BASF SE.

The H-functional starter substances may also be selected from the substance class of the polyester polyols, especially those having a molecular weight $M_n$ in the range from 200 to 4500 g/mol. Polyester polyols used may be at least difunctional polyesters. Preferably, polyester polyols consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Examples of alcohol components used include ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol, or mixtures of the stated alcohols. If the alcohol components used are dihydric or polyhydric polyether polyols, the result is polyesterether polyols which can likewise serve as starter substances for preparation of the polyethercarbonate polyols. Preference is given to using polyether polyols with $M_n$=150 to 2000 g/mol for preparation of the polyethercarbonate polyols.

As H-functional starter substances it is additionally possible to use polycarbonate diols, especially those having a molecular weight $M_n$ in a range from 150 to 4500 g/mol, preferably 500 to 2500 g/mol, which are prepared, for example, by reaction of phosgene, dimethyl carbonate, diethyl carbonate or diphenyl carbonate and difunctional alcohols or polyester polyols or polyether polyols. Examples relating to polycarbonates are found for example in EP-A 1359177. As polycarbonate diols it is possible for example to use the Desmophen® C grades from Bayer MaterialScience AG, such as Desmophen® C 1100 or Desmophen® C 2200, for example.

In a further embodiment of the invention, it is possible to use polyethercarbonate polyols and/or polyetherestercarbonate polyols as H-functional starter substances. In particular it is possible to use polyetherestercarbonate polyols. These polyetherestercarbonate polyols used as H-functional starter substances may for this purpose be prepared in a separate reaction step beforehand.

The H-functional starter substances generally have an OH-functionality (i.e. the number of H atoms active in respect of the polymerization per molecule) of 1 to 8, preferably of 2 to 6 and more preferably of 2 to 4. The H-functional starter substances are used either individually or as a mixture of at least two H-functional starter substances.

Preferred H-functional starter substances are alcohols with a composition according to the general formula (III)

$$HO-(CH_2)_x-OH \quad \text{(III)}$$

where x is a number from 1 to 20, preferably an even number from 2 to 20. Examples of alcohols of formula (III) are ethylene glycol, butane-1,4-diol, hexane-1,6-diol, octane-1,8-diol, decane-1,10-diol and dodecane-1,12-diol. Further preferred H-functional starter substances are neopentyl glycol, trimethylolpropane, glycerol, pentaerythritol, reaction products of the alcohols of formula (III) with ε-caprolactone, for example reaction products of trimethylolpropane with ε-caprolactone, reaction products of glycerol with ε-caprolactone and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH functionality of 2 to 4 and a molecular weight $M_n$ in the range from 62 to 4500 g/mol and more particularly a molecular weight $M_n$ in the range from 62 to 3000 g/mol.

Double metal cyanide (DMC) catalysts for use in the homopolymerization of alkylene oxides are known in principle from the prior art (see, for example, U.S. Pat. Nos. 3,404,109, 3,829,505, 3,941,849 and 5,158,922). DMC catalysts described, for example, in U.S. Pat. No. 5,470,813, EP-A 700 949, EP-A 743 093, EP-A 761 708, WO 97/40086, WO 98/16310 and WO 00/47649 have a very high activity and enable the preparation of polyoxyalkylene polyols at very low catalyst concentrations. A typical example are the high-activity DMC catalysts described in EP-A 700 949, which in addition to a double metal cyanide compound (e.g. zinc hexacyanocobaltate(III)) and an organic complex ligand (e.g. tert-butanol) also include a polyether having a number-average molecular weight of more than 500 g/mol.

The DMC catalysts which can be used in accordance with the invention are preferably obtained by (1.) in the first step, reacting an aqueous solution of a metal salt with the aqueous solution of a metal cyanide salt in the presence of one or more organic complex ligands, e.g. an ether or alcohol, (2.) in the second step, using known techniques (such as centrifuging or filtering) to remove the solid from the suspension obtained from (α), (3.) optionally, in a third step, washing the isolated solid with an aqueous solution of an organic complex ligand (e.g. by resuspending and subsequently again isolating by filtering or centrifuging), (4.) and subsequently drying the resulting solid, optionally after pulverizing, at temperatures of in general 20-120° C. and at pressures of in general 0.1 mbar to atmospheric pressure (1013 mbar), and by, in the first step or immediately after the precipitation of the double metal cyanide compound (second step), adding one or more organic complex ligands, preferably in excess (based on the double metal cyanide compound) and optionally further complex-forming components.

The double metal cyanide compounds included in the DMC catalysts which can be used in accordance with the invention are the reaction products of water-soluble metal salts and water-soluble metal cyanide salts.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition according to the general formula (IV), $$M(X)_n \qquad (IV)$$

where

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanide, isocyanate, isocyanate, isothiocyanate, carboxylate, oxalate and nitrate;

n is 1 if X=sulfate, carbonate or oxalate and n is 2 if X=halide, hydroxide, carboxylate, cyanate, thiocyanate, isocyanate, isothiocyanate or nitrate, or suitable metal salts preferably have a composition according to the general formula (V)

$$M_r(X)_3 \qquad (V)$$

where

M is selected from the metal cations $Fe^{3+}$, $Al^{3+}$, $Co^{3+}$ and $Cr^{3+}$, X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, carboxylate, cyanate, thiocyanate, isocyanate, isothiocyanate or nitrate, or suitable metal salts preferably have a composition according to the general formula (VI)

$$M(X)_s \qquad (VI)$$

where

M is selected from the metal cations $Mo^{4+}$, $V^{4+}$ and $W^{4+}$,

X comprises one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, carboxylate, cyanate, thiocyanate, isocyanate, isothiocyanate or nitrate, or suitable metal salts preferably have a composition according to the general formula (VII)

$$M(X)_t \qquad (VII)$$

where

M is selected from the metal cations $Mo^{6+}$ and $W^{6+}$,

X comprises one or more (i.e. different) anions, preferably anions selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VIII)

$$(Y)_a M'(CN)_b (A)_c \qquad (VIII)$$

where

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and a, b and c are integers, the values for a, b and c being selected so as to assure electronic neutrality of the metal cyanide salt; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds included in the DMC catalysts which can be used in accordance with the invention are compounds having compositions according to the general formula (IX)

$$M_x[M'_{x'}(CN)_y]_z \quad (IX)$$

in which M is defined as in the formulae (III) to (VI) and M' is defined as in formula (VII), and x, x', y and z are integral and are selected such as to ensure the electron neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, organic complex ligands used are water-soluble organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether, and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, bile acids or salts, esters or amides thereof, cyclodextrins, phosphorus compounds, α,β-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol), and a suspension is formed which comprises the double metal cyanide compound (e.g. zinc hexacyanocobaltate), water, excess metal salt, and the organic complex ligand.

The organic complex ligand may be present in the aqueous solution of the metal salt and/or the metal cyanide salt, or it is added directly to the suspension obtained after precipitation of the double metal cyanide compound. It has been found to be advantageous to mix the aqueous solutions of the metal salt and the metal cyanide salt and the organic complex ligand with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the catalyst) can be isolated from the suspension by known techniques, such as centrifugation or filtration.

In a preferred variant, the isolated solids, in a third process step, are then washed with an aqueous solution of the organic complex ligand (for example by resuspension and subsequent reisolation by filtration or centrifugation). In this way, for example, water-soluble by-products, such as potassium chloride, can be removed from the catalyst that can be used in accordance with the invention. Preferably, the amount of the organic complex ligand in the aqueous wash solution is between 40% and 80% by weight, based on the overall solution.

Optionally in the third step the aqueous wash solution is admixed with a further complex-forming component, preferably in the range between 0.5% and 5% by weight, based on the overall solution.

It is also advantageous to wash the isolated solids more than once. In a first washing step (3.-1), washing takes place preferably with an aqueous solution of the unsaturated alcohol (for example by resuspension and subsequent reisolation by filtration or centrifugation), in order thereby to remove, for example, water-soluble by-products, such as potassium chloride, from the catalyst usable in accordance with the invention. The amount of the unsaturated alcohol in the aqueous wash solution is more preferably between 40% and 80% by weight, based on the overall solution of the first washing step. In the further washing steps (3.-2), either the first washing step is repeated one or more times, preferably from one to three times, or, preferably, a nonaqueous solution, for example a mixture or solution of unsaturated alcohol and further complex-forming component (preferably in the range between 0.5 and 5 wt %, based on the total amount of the washing solution of step (3.-2)), is employed as the washing solution, and the solid is washed therewith one or more times, preferably one to three times.

The isolated and optionally washed solid can then be dried, optionally after pulverization, at temperatures of 20-100° C. and at pressures of 0.1 mbar to atmospheric pressure (1013 mbar).

One preferred method for isolating the DMC catalysts that can be used in accordance with the invention from the suspension by filtration, filtercake washing and drying is described in WO-A 01/80994.

The unsaturated comonomers may be distributed randomly or in blocks in the polyethercarbonate polyols. Gradient polymers can also be used.

In a further aspect of the process, the polyethercarbonate polyol having unsaturated groups is reacted with the phosphorus-functional compound of formula (Ia) at a temperature of not less than 100° C. and not more than 220° C. For the purposes of an efficient process regime with a sufficient reaction rate, this temperature range has been found to be particularly suitable. Advantageously, this reaction regime results in an end product without catalyst additions. Without being bound by theory, there is probably anionic addition of the phosphorus-functional compound onto the unsaturated groups of the polyethercarbonate polyol within this temperature range. Lower temperatures may lead to an only unsatisfactory conversion of the phosphorus-functional compound, while higher temperatures may lead to a reduced yield, as a result of the increase in side reactions.

In a further aspect of the process, the polyethercarbonate polyol having unsaturated groups is reacted with the phosphorus-functional compound of formula (Ia) at a temperature of not less than 0° C. and not more than 100° C., and a compound selected from the group of the basic catalysts will be added. It is possible to use, for example, basic catalysts that are known to the person skilled in the art for use within a Michael addition. Basic catalysts used may preferably be tertiary amines, for example diazabicyclooctane (DABCO), amidines, for example 1,5-diazabicyclo[5.4.0]undec-5-ene (BDU) or 1,8-diazabicyclo[5.4.0]undec-7-ene (DBU), guanidines, for example triazabicyclodecene, N-methyltriazabicyclodecene, N-butyltriazabicyclodecene or tetramethylguanidine, pentamethylguanidine, and/or phosphorus imine bases or proazaphosphatranes as basic catalysts. It is also possible to use mixtures of different basic catalysts. The use of these catalysts within the temperature range specified leads to rapid and low-by-product conversion of the phosphorus-functional compounds onto the polyethercarbonate polyols having unsaturated groups.

In a further aspect of the process, the polyethercarbonate polyol having unsaturated groups is reacted with the phosphorus-functional compound of formula (Ia) at a temperature of not less than 0° C. and not more than 100° C., and a compound selected from the group of the photoinitiators, peroxides, azo compounds, metal-activated peroxides and/or redox initiators is added. The reaction of the polyethercarbonate polyol having unsaturated groups with the phosphorus-functional compound can be accelerated, for example, with initiators described in T. Myers, N. Kirk-Othmer, Encyclopedia of Chemical Technology (5th Edition) (2005), 14 274-311 or in J. C. Bevington, Makromolekulare Chemie, Macromolecular Symposia (1987), 10(1), 89, photoinitiators described in J. P. Fouassier, X. Allonas, J. Lalevee; C. Dietlin, Photochemistry and Photophysics of Polymer Materials (2010), 351-419, metal-activated peroxides described in C. Sma, Angewandte Makromolekulare Chemie (1969), 9 165-181, or with redox initiators described in G. S. Misra, U. D. N. Bajpai Progress in Polymer Science (1982) 8 (1-2), 61-131.

Preference is given to using photoinitiators. Photoinitiators usable in accordance with the invention are, for example, bis(2,4,6-trimethylbenzoyl)phenylphosphine oxide, diphenylmesitoylphosphine oxide, camphorquinone, isopropylthioxanthone, Michler's ketone, benzophenone, benzoin methyl ether, dimethoxyphenylacetophenone or 2,2-dimethyl-2-hydroxyacetophenone.

The free-radical initiators can be used in amounts of not less than 0.01% by weight and not more than 2% by weight, based on the polyethercarbonate polyol. Redox initiators here are a mixture of an oxidizing substance and a reducing substance. The phosphorus-functional compounds used for functionalization may also assume the function of a reducing substance. Type II photoinitiators require the addition of a hydrogen donor, such as an amine or a further phosphine compound, although the phosphorus-functional compounds that are added onto the unsaturated groups can also fulfill this function.

The invention further provides phosphorus-functional polyethercarbonate polyols obtainable by the process of the invention. The phosphorus-functional polyethercarbonate polyols preparable by the process of the invention show good flame-retardant action and can, by virtue of their steric construction and the resulting viscosity, be very efficiently processed further within further processes, for example a subsequent crosslinking operation. The phosphorus-functional polyethercarbonate polyols of the invention or the reaction products thereof with isocyanates may additionally, if required, be further additized with customary external flame retardant additives, such as halohydrocarbons, optionally with antimony trioxide as synergist, (encapsulated) red phosphorus, monomeric or oligomeric phosphorus compounds, polyhedral oligomeric silsesquioxanes, other siloxanes, melamine isocyanurate, melamine polyphosphate, cyclophosphazenes, carbon nanotubes, fullerenes, montmorillonite or aluminum hydroxide. The addition of further additives as described, for example, in Progress in Polymer Science 34 (2009) 1068-1133 is also possible.

In one configuration of the process, in a further process step, the phosphorus-functional polyethercarbonate polyols can be crosslinked by addition of di- or polyisocyanates. In one embodiment, mixtures of polyethercarbonate polyols and phosphorus-functional polyethercarbonate polyols are reacted with one or more di- or polyisocyanates. Preference is given here to reacting at least one phosphorus-functional polyethercarbonate polyol with one or more di- or polyisocyanates. The details of the reaction of polyols with di- or polyisocyanates are known to the person skilled in the art from polyurethane chemistry.

The invention further provides crosslinked phosphorus-functional polyethercarbonate polyol polymers obtainable by the process of the invention. The crosslinked phosphorus-functional polyethercarbonate polyol polymers are notable for reproducible mechanical properties and a controllable reaction regime, since the reactants have a narrow and defined molecular weight distribution and the further crosslinking is effected only subsequently. In this way, it is possible to avoid side reactions in the course of crosslinking of the polyethercarbonate polyols as early as in the course of phosphorus functionalization. Furthermore, the crosslinked phosphorus-functional polyethercarbonate polyol polymers have good flame-retardant properties without significant losses within the scope of the other quality criteria for crosslinked systems, such as stiffness, mechanical durability, abrasion properties, elasticity or the like.

The phosphorus-functional polyethercarbonate polyols obtainable by the process of the invention can be used as flame-retardant adhesion promoters, filler-activators or additives. Specifically the inventive combination of the different functional groups in the polymer, on account of the combination of hydrophilic and hydrophobic properties, can lead to particularly good suitability for binding of different polar interfaces to one another. Accordingly, the phosphorus-functional polyethercarbonate polyols preparable in accordance with the invention have particularly good usability in the cases where adhesion between different polar interfaces is desired. It is likewise possible through the use of the phosphorus-functional polyethercarbonate polyols to achieve better dispersion of fillers. This can contribute to a more rapid reaction regime for the purposes of crosslinking reactions and accordingly contribute to a more homogeneous end product.

Furthermore, the crosslinked phosphorus-functional polyethercarbonate polyol polymers obtainable by the process of the invention can find use as flame-retardant coating, foam, sealing compound, thermoplastic, thermoset, rubber. This use of the crosslinked phosphorus-functional polyethercarbonate polyol polymers may be particularly advantageous since the chosen process regime only insignificantly impairs the other use properties of the crosslinked phosphorus-functional polyethercarbonate polyol polymers by virtue of the flame-retardant functionalization. This is most probably because of a smaller number of unwanted by-products in the course of the synthesis of the polyethercarbonate polyols having unsaturated groups, a more constant molecular weight distribution of the polyethercarbonate polyols having unsaturated groups used, and more controlled phosphorus functionalization.

Likewise within the scope of the invention are moulded bodies having a flame-retardant layer comprising a flame-retardant crosslinked phosphorous-functional polyethercarbonate polyol polymer preparable by the process of the invention. The crosslinked phosphorus-functional polyethercarbonate polyol polymers prepared in accordance with the invention may be particularly suitable for construction of flame-retardant, mechanically stable layers on moulded bodies, since the polyethercarbonate polyols of the invention can be positioned simply and reproducibly on moulded bodies, and any crosslinking reaction with diiso- or polyisocyanates is performable easily and reproducibly.

For further advantages and features of the above-described moulded body, reference is hereby made explicitly to the elucidations in connection with the crosslinked phosphorus-functional polyethercarbonate polyol polymers of the invention and with the process of the invention. Inventive features and advantages of the phosphorus-functional polyethercarbonate polyols of the invention shall also be applicable to the process of the invention and to the crosslinked phosphorus-functional polyethercarbonate polyols of the invention and are considered to be disclosed as such, and vice versa. The invention also encompasses all combinations of at least two features disclosed in the description and/or in the claims.

EXAMPLES

H-Functional Starter Substance (Starter) Used:
PET-1 difunctional poly(oxypropylene)polyol having an OH number of 112 $mg_{KOH}/g$
Alkylene oxide bearing no double bonds used:
PO propylene oxide
Comonomer Used:
MA maleic anhydride, containing electron-deficient double bonds AGE allyl glycidyl ether, containing electron-rich double bonds
Phosphorus Compound Used:
DOPO 9,10-dihydro-9-oxa-phosphaphenanthrene 10-oxide
Free-radical initiator used:
Irgacure 819 bis(2,4,6-trimethylbenzoyl)phenylphosphine oxide
The DMC catalyst was prepared according to example 6 of WO-A 01/80994.

The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (maximum heating power 510 watts). The counter-cooling consisted of an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which projected into the reactor up to 3 mm above the base.

The heating power of the electrical heating jacket during the activation [first activation stage] averaged about 20% of the maximum heating power. As a result of the adjustment, the heating power varied by ±5% of the maximum heating power. The occurrence of increased evolution of heat in the reactor, brought about by the rapid reaction of propylene oxide during the activation of the catalyst [second activation stage], was observed via reduced heating power of the heating jacket, engagement of the counter-cooling, and, optionally, a temperature increase in the reactor.

The occurrence of evolution of heat in the reactor, brought about by the continuous reaction of propylene oxide during the reaction [polymerization stage], led to a fall in the power of the heating jacket to about 8% of the maximum heating power. As a result of the adjustment, the heating power varied by ±5% of the maximum heating power.

The hollow shaft stirrer used in the examples was a hollow shaft stirrer in which the gas was introduced into the reaction mixture via a hollow shaft in the stirrer. The stirrer body attached to the hollow shaft comprised four arms, had a diameter of 35 mm and a height of 14 mm. Each end of the arm had two gas outlets of 3 mm in diameter attached to it. The rotation of the stirrer gave rise to a reduced pressure such that the gas present above the reaction mixture ($CO_2$ and possibly alkylene oxide) was drawn off and introduced through the hollow shaft of the stirrer into the reaction mixture.

The impeller stirrer used in some examples was a pitched blade turbine in which a total of two stirrer levels each having four stirrer paddles (45°) which had a diameter of 35 mm and a height of 10 mm were mounted at a distance of 7 mm on the stirrer shaft.

a) The terpolymerization of propylene oxide, allyl glycidyl ether and $CO_2$ results not only in the cyclic propylene carbonate but also in the polyethercarbonate polyol containing firstly polycarbonate units shown in formula (Xa)

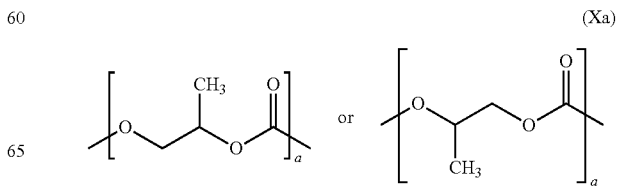

(Xa)

and secondly polyether units shown in formula (Xb)

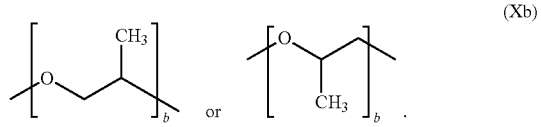

(Xb)

In the case of incorporation of cyclic anhydrides into the polymer chain, this additionally contains ester groups.

The reaction mixture was characterized by NMR spectroscopy and gel permeation chromatography.

The ratio of the amount of cyclic propylene carbonate to polyethercarbonate polyol (selectivity; c/a ratio) and the proportion of unconverted monomers (propylene oxide $R_{PO}$, allyl glycidyl ether RAGE in mol %) were determined by means of $^1H$ NMR spectroscopy. For this purpose, a sample of each reaction mixture obtained after the reaction was dissolved in deuterated chloroform and measured on a Bruker spectrometer (AV400, 400 MHz).

Subsequently, the reaction mixture was diluted with dichloromethane (20 ml) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture which had been purified to free it of volatile constituents (unconverted epoxides, cyclic carbonate, solvent) was collected in a receiver at the lower end of the heated tube.

The molar ratio of carbonate groups to ether groups in the polyethercarbonate polyol (α/b ratio) and the molar proportion of comonomers incorporated into the polymer were determined by means of NMR spectroscopy. For this purpose, a sample of each purified reaction mixture was dissolved in deuterated chloroform and measured on a Bruker spectrometer (AV400, 400 MHz).

The relevant resonances in the $^1H$ NMR spectrum (based on TMS=0 ppm) which were used for integration are as follows:

The figures reported are the molar ratio of the amount of cyclic propylene carbonate to carbonate units in the polyethercarbonate polyol or polyetherestercarbonate polyol (selectivity c/a) and the molar ratio of carbonate groups to ether groups in the polyethercarbonate polyol or polyetherestercarbonate polyol (α/b), and the proportions of the unconverted propylene oxide (in mol %) and maleic anhydride (in mol %).

Taking account of the relative intensities, the values were calculated as follows:

Molar ratio of the amount of cyclic propylene carbonate to carbonate units in the polyethercarbonate polyol or polyetherestercarbonate polyol (selectivity c/a):

$$c/a = I3/I2 \quad (XI)$$

Molar ratio of carbonate groups to ether groups in the polyethercarbonate polyol or polyetherestercarbonate polyol (a/b):

$$a/b = I2/I1 \quad (XII)$$

The molar proportion of the unconverted propylene oxide ($R_{PO}$ in mol %) based on the sum total of the amount of propylene oxide used in the activation and the copolymerization, calculated by the formula:

$$R_{PO} = [(I4/1)/((I1/3)+(I2/3)+(I3/3)+(I4/1))] \times 100\% \quad (XIII)$$

The figures for the proportions A are based hereinafter on polyetherestercarbonate polyols that have been obtained using maleic anhydride as comonomer.

The molar proportion of the unconverted maleic anhydride ($R_{MA}$ in mol %) based on the sum total of the amount of maleic anhydride used in the activation and the copolymerization is calculated by the formula:

$$R_{MA} = [(I6/2)/((I6/2)+(I7/2))] \times 100\% \quad (XIV)$$

Proportion of carbonate units in the repeat units of the polyetherestercarbonate polyol:

$$A_{carbonate}[(I2/3)/((I1/3)+(I2/3)+(I6/2))] \times 100\% \quad (XV)$$

Proportion of the double bonds which result via the incorporation of the maleic anhydride in the repeat units of the polyetherestercarbonate polyol:

$$A_{double\ bond} = [(I6/2)/((I1/3)+(I2/3)+(I6/2))] \times 100\% \quad (XVI)$$

Proportion of DOPO units in the repeat units of the polyetherestercarbonate polyol:

$$A_{DOPO} = [(I8/2)/((I1/3)+(I2/3)+(I8/2)+(I6))] \times 100\% \quad (XVII)$$

| Signal | Shift in ppm | Assignment | Area corresponding to number of H atoms |
|---|---|---|---|
| I1 | 1.10-1.17 | $CH_3$ group of the polyether units | 3 |
| I2 | 1.25-1.34 | $CH_3$ group of the polycarbonate units | 3 |
| I3 | 1.45-1.48 | $CH_3$ group of the cyclic carbonate | 3 |
| I4 | 2.95-3.00 | CH groups of the free propylene oxide not consumed by reaction | 1 |
| I5 | 5.83-5.94 | CH group of the double bond obtained in the polymer via the incorporation of allyl glycidyl ether | 1 |
| I6 | 6.22-6.29 | CH group of the double bond obtained in the polymer via the incorporation of maleic anhydride | 2 |
| I7 | 7.03-7.04 | CH group for free maleic anhydride not consumed by reaction | 2 |
| I8 | 2.59-2.66 & 2.75-2.78 | CH group of the DOPO incorporated into the polymer | 2 |
| I9 | 1.74-1.84 | CH group of the DOPO incorporated into the polymer | 2 |

The figures for the proportions B are based hereinafter on polyethercarbonate polyols that have been obtained using allyl glycidyl ether as comonomer.

The proportion of carbonate units in the repeat units of the polyethercarbonate polyol:

$$B_{carbonate}=[(I2/3)/((I1/3)+(I2/3)+(I5/1))]\times 100\% \quad (XVIII)$$

The proportion of double bonds resulting from the incorporation of the allyl glycidyl ether in the repeat units of the polyethercarbonate polyol:

$$B_{double\ bond}=[(I5)/((I1/3)+(I2/3)+(I5/1))]\times 100\% \quad (XIX)$$

The proportion of DOPO units in the repeat units of the polyethercarbonate polyol:

$$B_{DOPO}=[(I9/2)/((I1/3)+(I2/3)+(I9/2)+(I5))]\times 100\% \quad (XX)$$

Preparation of the Polyethercarbonate Polyols

Polyethercarbonate Polyol A:
Terpolymerization of propylene oxide, maleic anhydride (9.5 mol %) and $CO_2$

[First Activation Stage]
A 970 ml pressure reactor equipped with a gas introduction stirrer was charged with a mixture of DMC catalyst (104 mg) and PET-1 (130 g) and this initial charge was stirred at 130° C. for 30 minutes under a partial vacuum (50 mbar), with argon being passed through the reaction mixture.

[Second Activation Stage]
Following injection of 15 bar of $CO_2$, at which a slight drop in temperature was observed, and following re-establishment of a temperature of 130° C., 13.0 g of a monomer mixture (15 wt % of maleic anhydride, corresponding to 9.5 mol %, in solution in propylene oxide) were metered in by means of an HPLC pump (1 ml/min). The reaction mixture was stirred (800 rpm) at 130° C. for 20 min. The addition of 13.0 g of a monomer mixture was repeated a second and third time.

[Polymerization Stage]
After cooling to 100° C. had taken place, a further 186.0 g of the monomer mixture (15% by weight of maleic anhydride, corresponding to 9.5 mol %) were metered in via an HPLC pump (6 ml/min), keeping the $CO_2$ pressure constant at 15 bar. The reaction mixture was then stirred at 100° C. for a further 2 h. The reaction was halted by cooling of the reactor with ice-water.

Product Properties:
The resulting mixture was free of the propylene oxide ($R_{PO}=0\%$) and maleic anhydride ($R_{MA}=0\%$) monomers used.

| | | |
|---|---|---|
| Selectivity | c/a | 0.04 |
| | a/b | 0.27 |
| $A_{carbonate}$ in % | | 21.2 |
| $A_{double\ bond}$ in % | | 5.7 |
| Molecular weight in $M_n$ g/mol | | 4175 |
| Polydispersity | | 1.2 |
| OH number in $mg_{KOH}/g$ | | 38.0 |

Example 1: Preparation of DOPO-Containing Polyethercarbonate Polyol

In a 250 ml two-neck flask, DOPO (12.01 g, 0.06 mol) and DBU (1.69 g, 0.01 mol) were dissolved in THF (40 ml). Subsequently, a further solution of polyethercarbonate polyol A (50.0 g) in THF (130 ml) was prepared. This polyethercarbonate polyol solution was transferred into the two-neck flask with the aid of a dropping funnel. The reaction mixture was stirred for one hour. The solvent was then removed under reduced pressure.

Product Properties:

| | |
|---|---|
| $A_{DOPO}$ in % | 4.84 (1.95 wt % of P) |
| Molecular weight in $M_n$ g/mol | 3921 |
| Polydispersity | 1.3 |
| OH number in $mg_{KOH}/g$ | 34.3 |

Preparation of the Polyurethanes

Example 2: Preparation of a Polyurethane from Phosphorus-Containing Polyethercarbonate Polyol For the preparation of phosphorus-containing polyurethane (sample PU-1), the DOPO-containing polyethercarbonate polyol from example 1 (8.2 g) was admixed with an equimolar amount of aliphatic polyisocyanate (HDI trimer, Desmodur N3300, 1.0 g) and 1000 ppm of dibutyltin laurate. The sample was cured on a planar metal plate. Subsequently, the phosphorus-containing polyurethane sample (1.5 g, 20×15×2 mm) was exposed to a flame for 10 s in order to test fire resistance.

Example 3 (Comp.): Preparation of a Polyurethane from Polyethercarbonate Polyol

For the preparation of polyurethane without phosphorus (sample PU-2), the polyethercarbonate polyol A (7.4 g) was admixed with an equimolar amount of aliphatic polyisocyanate (HDI trimer, Desmodur N3300, 1.0 g) and 1000 ppm of dibutyltin laurate. The sample was cured on a planar metal plate. Subsequently, the polyurethane sample (1.5 g, 20×15×2 mm) was exposed to a flame for 10 s in order to test fire resistance.

Results of the Flame Test
The results from the flame test are given in the table below for the polyurethane sample from example 2 and the polyurethane sample from comparative example 3. The phosphorus content reported is based on the polyurethane sample.

| Example | Phosphorus content (wt %) | Appearance of the sample during the duration of flame contact of 10 s | Appearance of the sample 1 s after flame contact | Appearance of the sample 30 s after flame contact | Fire resistance |
|---|---|---|---|---|---|
| 2 | 1.7 | The flame height is 26 mm | No flame visible | No flame visible | Flame-retardant |

| Example | Phosphorus content (wt %) | Appearance of the sample during the duration of flame contact of 10 s | Appearance of the sample 1 s after flame contact | Appearance of the sample 30 s after flame contact | Fire resistance |
|---|---|---|---|---|---|
| 3 (comp.) | — | The surface of the sample has melted<br>The flame height is 30 mm<br>Burning droplets form | The surface of the sample has melted<br>The sample continues to burn independently with a flame height of 35 mm<br>Burning droplets form | The surface of the sample has melted<br>No flame visible<br>The sample has visibly melted | Flammable |

Comp. comparative example

Comparison

The comparison of the results from example 2 with comparative example 3 shows that the phosphorus-containing polyurethane sample has much higher fire resistance.

Preparation of the Polyethercarbonate Polyols

Polyethercarbonate polyol B: Terpolymerization of propylene oxide, allyl glycidyl ether (9.5 mol %) and $CO_2$

[First Activation Stage]

A 970 ml pressure reactor equipped with a gas introduction stirrer was charged with a mixture of DMC catalyst (48 mg) and PET-1 (80 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 8.0 g of a monomer mixture (16.7% by weight of allyl glycidyl ether [corresponding to 9.5 mol %] in solution in propylene oxide) were metered in by means of an HPLC pump (1 ml/min). The reaction mixture was stirred (800 rpm) at 130° C. for 20 min. The addition of 8.0 g of a monomer mixture was repeated a second and third time.

[Polymerization Stage]

After cooling to 100° C. had taken place, a further 136.0 g of the monomer mixture (16.7% by weight of allyl glycidyl ether, corresponding to 9.5 mol %) were metered in via an HPLC pump (1 ml/min), keeping the $CO_2$ pressure constant at 15 bar. The reaction mixture was then stirred at 100° C. for a further 2 h. The reaction stopped by cooling the reactor with ice-water.

Product Properties:

The resulting mixture was free from the propylene oxide and allyl glycidyl ether monomers used.

| Selectivity | c/a | 0.07 |
|---|---|---|
| | a/b | 0.19 |
| $B_{carbonate}$ in % | | 14.9 |
| $B_{double\ bond}$ in % | | 5.5 |
| Molecular weight in $M_n$ g/mol | | 4678 |
| Polydispersity | | 1.4 |
| OH number in $mg_{KOH}$/g | | 36.3 |

Example 4: Preparation of DOPO-Containing Polyethercarbonate Polyol

The polyethercarbonate polyol B (10.0 g) and DOPO (2.2 g) were mixed and heated to 120° C. On completion of dissolution of the DOPO, the temperature was adjusted to 80° C. Subsequently, the Irgacure 819 photoinitiator (100 mg) was introduced into the reaction mixture. The solution was irradiated with UV light (22 W/cm$^2$) for 2 min. The product prepared was analyzed by means of NMR spectroscopy and GPC.

Product Properties:

| $B_{DOPO}$ in % | 3.72 (1.53 wt % of P) |
|---|---|
| Molecular weight in $M_n$ g/mol | 5288 |
| Polydispersity | 2.3 |
| OH number in $mg_{KOH}$/g | 30.3 |

Preparation of the Polyurethanes

Example 5: Preparation of a Polyurethane from Phosphorus-Containing Polyethercarbonate Polyol For the preparation of phosphorus-containing polyurethane (PU-3), the DOPO-containing polyethercarbonate polyol from example 4 (9.3 g) was admixed with an equimolar amount of aliphatic polyisocyanate (HDI trimer, Desmodur N3300, 1.0 g) and 1000 ppm of dibutyltin laurate. The sample was cured on a planar metal plate. Subsequently, the phosphorus-containing polyurethane sample (1.5 g, 20×15×2 mm) was exposed to a flame for 10 s in order to test fire resistance.

Example 6 (Comp.): Preparation of a Polyurethane from Polyethercarbonate Polyol

For the preparation of polyurethane without phosphorus (PU-4), the polyethercarbonate polyol B (7.7 g) was admixed with an equimolar amount of aliphatic polyisocyanate (HDI trimer, Desmodur N3300, 1.0 g) and 1000 ppm of dibutyltin laurate. The sample was cured on a planar metal plate. Subsequently, the polyurethane sample (1.5 g, 20×15×2 mm) was exposed to a flame for 10 s in order to test fire resistance.

Results of the Flame Test

The results from the flame test are given in the table below for the polyurethane sample from example 5 and the polyurethane sample from comparative example 6. The phosphorus content reported is based on the polyurethane sample.

| Example | Phosphorus content (wt %) | Appearance of the sample during the duration of flame contact of 10 s | Appearance of the sample 1 s after flame contact | Appearance of the sample 30 s after flame contact | Fire resistance |
|---|---|---|---|---|---|
| 7 | 1.4 | The flame height is 26 mm | No flame visible | No flame visible | Flame-retardant |
|  |  | The surface of the sample has melted | The surface of the sample has melted | The surface of the sample has melted |  |
| 6 (comp.) | — | The flame height is 30 mm | The sample continues to burn independently with a flame height of 35 mm | No flame visible | Flammable |
|  |  | Burning droplets form | Burning droplets form | The sample has visibly melted |  |

Comp. comparative example

Comparison

The comparison of the results from example 5 with comparative example 6 shows that the phosphorus-containing polyurethane sample has much higher fire resistance.

What is claimed is:

1. A process for preparing a phosphorus-functional polyethercarbonate polyol, comprising reacting a polyethercarbonate polyol having unsaturated groups with a phosphorus-functional compound of formula (Ia):

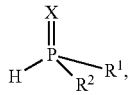

(Ia)

wherein X=O or S;
and wherein $R^1$ and $R^2$ are selected from the group consisting of C1-C22 alkyl, C1-C22 alkoxy, C1-C22 alkylsulfanyl, C6-C70 aryl, C6-C70 aryloxy, C6-C70 arylsulfanyl, C7-C70 aralkyl, C7-C70 aralkyloxy, C7-C70 aralkylsulfanyl, C7-C70 alkylaryl, C7-C70 alkylaryloxy, C7-C70 alkylarylsulfanyl, or
wherein $R^1$ and $R^2$ are bridged to one another directly and/or via heteroatoms and are selected from the group consisting of C1-C22 alkylene, oxygen, sulfur, and $NR^5$,
wherein $R^5$ is hydrogen, C1-C22 alkyl, C1-C22 acyl, C7-C22 aralkyl, or C6-C70 aryl radical.

2. The process as claimed in claim 1, wherein the phosphorus-functional compound of the formula (Ia) is a compound of the formula (Ib)

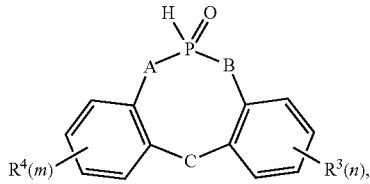

(Ib)

wherein A, and C are independently selected from the group consisting of a chemical bond, O, NH, N—(C1-C10 alkyl), and N—(C6-C14 aryl),
wherein $R^3$ and $R^4$ are independently selected from the group consisting of C1-C10 alkyl, C1-C10 alkoxy, C6-C14 aryl, C6-C14 aryloxy, and C9-C17 aralkyl, and
wherein n and m are independently 0, 1, 2, 3 or 4.

3. The process as claimed in claim 2,
wherein $R^3$ and $R^4$ are selected from the group consisting of C1-C8 alkyl and C1-C8 alkoxy, and
wherein n and m are independently 0 or 1.

4. The process as claimed in claim 1, wherein the phosphorus-functional compound is 9,10-dihydro-9-oxa-10-phosphaphenanthrene 10-oxide and/or butyl P-methylphosphinate.

5. The process as claimed in claim 1, wherein the polyethercarbonate polyol having unsaturated groups is selected from polyethercarbonate polyols having unsaturated groups or polyetherestercarbonate polyols having unsaturated groups.

6. The process as claimed in claim 1, wherein the polyethercarbonate polyol having unsaturated groups has been obtained by reacting a starter compound with one or more alkylene oxides, carbon dioxide, and one or more further monomers selected from the group of the alkylene oxides, the cyclic anhydrides of dicarboxylic acids, the lactones, lactides, and cyclic 6-membered carbonates, with the proviso that at least one of the further monomers used contains one or more C—C double or triple bonds.

7. The process as claimed in claim 1, wherein a phosphorus content of the phosphorus-functional polyethercarbonate polyols is between 0.5% and 15% by weight.

8. The process as claimed in claim 1, wherein the polyethercarbonate polyol having unsaturated groups has been prepared by a process comprising the following steps:
   (α) initially charging an H-functional starter compound and a DMC catalyst,
   (β) optionally metering in an epoxide,
   (γ) metering in
      (γ1) at least one epoxide, and
      (γ2) at least one epoxide, a cyclic anhydride of a dicarboxylic acid, a lactone, a lactide and/or a cyclic 6-membered carbonate having a double bond, and
      (γ3) carbon dioxide.

9. The process as claimed in claim 1, wherein the polyethercarbonate polyol having unsaturated groups is reacted with the phosphorus-functional compound of formula (Ia) at a temperature of not less than 100° C. and not more than 220° C.

10. The process as claimed in claim 1, wherein the polyethercarbonate polyol having unsaturated groups is reacted with the phosphorus-functional compound of formula (Ia) at a temperature of not less than 0° C. and not more than 100° C. and, in the reaction,
- a compound selected from the group of the basic catalysts or
- a compound selected from the group of the photoinitiators, peroxides, azo compounds, metal-activated peroxides and/or redox initiators is added.

11. A phosphorus-functional polyethercarbonate polyol obtainable by the process as claimed in claim 1.

12. A process for preparing a phosphorus-functional polyurethane polymer, wherein at least one phosphorus-functional polyethercarbonate polyol as claimed in claim 11 is reacted with one or more di- or polyisocyanates.

13. A phosphorus-functional polyurethane polymer obtainable by a process as claimed in claim 12.

14. A product comprising the phosphorus-functional polyethercarbonate polyol as claimed in claim 11, the product selected from the group consisting of a flame-retardant adhesion promoter, a filler-activator, a flame retardant, flame-retardant coating, a foam, a sealing compound, a thermoplastic, a thermoset, or a rubber.

15. A moulded body having a flame-retardant layer comprising a phosphorus-functional polyurethane polymer as claimed in claim 13.

16. A product comprising the phosphorus-functional polyurethane polymer as claimed in claim 13, the product selected from the group consisting of a flame-retardant adhesion promoter, a filler-activator, a flame retardant, a flame-retardant coating, a foam, a sealing compound, a thermoplastic, a thermoset, or a rubber.

* * * * *